United States Patent
White

(10) Patent No.: US 10,760,806 B1
(45) Date of Patent: Sep. 1, 2020

(54) THERMOSTAT WITH FAILSAFE MECHANISM

(71) Applicant: Matthew Marvin White, Eagle River, AK (US)

(72) Inventor: Matthew Marvin White, Eagle River, AK (US)

( * ) Notice: Subject to any disclaimer, the term of this patent is extended or adjusted under 35 U.S.C. 154(b) by 0 days.

(21) Appl. No.: 16/738,950

(22) Filed: Jan. 9, 2020

(51) Int. Cl.
*F24F 11/30* (2018.01)
*G05D 23/19* (2006.01)
*F24F 110/12* (2018.01)
*F24F 110/10* (2018.01)

(52) U.S. Cl.
CPC .......... *F24F 11/30* (2018.01); *G05D 23/1925* (2013.01); *F24F 2110/10* (2018.01); *F24F 2110/12* (2018.01)

(58) Field of Classification Search
CPC ........ F24F 11/30; F24F 11/89; F24F 2110/10; F24F 11/12; G05D 23/1925
See application file for complete search history.

(56) References Cited

U.S. PATENT DOCUMENTS

| 2006/0006244 | A1* | 1/2006 | Morrow | G05D 23/1902 236/1 C |
| 2015/0204572 | A1* | 7/2015 | Novotny | G05D 23/19 236/1 C |
| 2015/0345818 | A1* | 12/2015 | Oh | G05D 23/2754 236/1 C |

\* cited by examiner

*Primary Examiner* — Marc E Norman
(74) *Attorney, Agent, or Firm* — Jeffer Mangels; Butler & Mitchell LLP; Brennan C. Swain, Esq.

(57) ABSTRACT

A failsafe assembly for use with a thermostat that includes a housing that defines a housing interior, and first and second thermoswitches disposed in the housing interior. The first thermoswitch includes an open and a closed state and is normally in the open state. The first thermoswitch is configured to switch to the closed state when an ambient temperature drops below a predetermined lower threshold temperature and the first thermoswitch is configured to switch back to the open state when the ambient temperature rises above a predetermined first safety temperature. The second thermoswitch includes an open and a closed state and is normally in the open state. The second thermoswitch is configured to switch to the closed state when the ambient temperature exceeds a predetermined upper threshold temperature. The second thermoswitch is configured to switch back to the open state when the ambient temperature drops below a predetermined second safety temperature.

9 Claims, 3 Drawing Sheets

THERMOSTAT WITH FAILSAFE MECHANISM

FIELD OF THE INVENTION

The present invention relates to a thermostat, and more particularly, to a thermostat with a failsafe mechanism.

BACKGROUND OF THE INVENTION

In 2009 the International Energy Conservation Code mandated programmable thermostats be installed in new construction. Additionally many of the homes built prior to that have been upgraded with programmable thermostats to improve the energy efficiency of their homes.

The problem with a programmable thermostat is that almost all of the systems rely on a battery powered microprocessor to control zone temperature. When the battery fails or the programming becomes corrupt there is no signal to the furnace/boiler or the air conditioning unit.

SUMMARY OF THE PREFERRED EMBODIMENTS

In accordance with a first aspect of the present invention there is provided a failsafe assembly for use with a thermostat that includes a housing that defines a housing interior, and first and second thermoswitches disposed in the housing interior. The first thermoswitch includes an open and a closed state and is normally in the open state. The first thermoswitch is configured to switch to the closed state when an ambient temperature drops below a predetermined lower threshold temperature and the first thermoswitch is configured to switch back to the open state when the ambient temperature rises above a predetermined first safety temperature. The second thermoswitch includes an open and a closed state and is normally in the open state. The second thermoswitch is configured to switch to the closed state when the ambient temperature exceeds a predetermined upper threshold temperature. The second thermoswitch is configured to switch back to the open state when the ambient temperature drops below a predetermined second safety temperature.

In a preferred embodiment, the housing includes top, bottom and first and second side walls and a back wall that cooperate to define the housing interior. The back wall defines a wire opening therein, and the front of the housing is open. Preferably, at least one of the top, bottom and first and second side walls includes a slot defined therein.

In accordance with another aspect of the present invention, there is provided a thermostat assembly that includes a thermostat housing that includes wiring for communication with an air conditioning unit, a wall plate removably secured to a back surface of the thermostat housing, and a failsafe assembly. The wall plate includes first and second connection openings defined therein. The failsafe assembly includes a housing that defines a housing interior, and first and second thermoswitches disposed in the housing interior. The first thermoswitch includes an open and a closed state and is normally in the open state. The first thermoswitch is configured to switch to the closed state when an ambient temperature drops below a predetermined lower threshold temperature and the first thermoswitch is configured to switch back to the open state when the ambient temperature rises above a predetermined first safety temperature. The second thermoswitch includes an open and a closed state and is normally in the open state. The second thermoswitch is configured to switch to the closed state when the ambient temperature exceeds a predetermined upper threshold temperature. The second thermoswitch is configured to switch back to the open state when the ambient temperature drops below a predetermined second safety temperature. The first and second thermoswitches are wired in parallel with the wiring of the thermostat housing.

In a preferred embodiment, the housing includes top, bottom and first and second side walls and a back wall that cooperate to define the housing interior. The back wall defines a wire opening therein and the front of the housing is open. Preferably, at least one of the top, bottom and first and second side walls includes a slot defined therein. The wall plate includes a ridge defined therein, and the ridge is received in the slot.

As discussed above, programmable thermostats in the market place today rely on a battery powered microprocessor to regulate zone temperatures. In cold climates, when the battery fails there is no signal to the furnace or boiler, which may result in frozen pipes and subsequent water damage. Similarly, in hot climates, when the battery fails the temperature inside a home can be significantly higher than the outdoor ambient temperature endangering interior finishes, artwork and family pets. The present invention provides a failsafe mechanism that prevents both overheating of a user's home and prevents pipes from freezing. Many thermostats today also include Bluetooth capability and/or the ability to connect to the internet. These types of thermostats also typically rely on battery power. Furthermore, these thermostats are susceptible to hacking. Therefore, someone could hack the thermostat and set the temperature below and/or above the threshold temperatures discussed herein, thereby causing the temperature to drop to low or run to high. The present invention also protects against this possibility.

In a preferred embodiment, the present invention utilizes at least one and preferably two bi-metal thermoswitches that are not adjustable and are set at a predetermined lower and upper threshold temperature. In an exemplary embodiment, the lower threshold temperature is 50° F. (10° C.) and the upper threshold temperature is 80° F. (26° C.). In use, the device sends a signal to the boiler/furnace (or other heating device) when the temperature falls below the lower threshold temperature 50° F. (10 C) and/or sends a signal to the air conditioner (or other cooling device) when the indoor temperature exceeds the upper threshold temperature.

In a preferred embodiment, the device is retrofittable to common programmable thermostats in use or on the market (referred to herein as "existing programmable thermostat(s)"). For example, the failsafe assembly can be used with following Honeywell models RTH6580WF, RTH7600D, TH5110D1006, TH3110D1008, RTH22131B1021/E1, RTH2410B1001, RTH645D1009, RTH111B, RTH51100B, R1H2300B1038/U1, TRH2510B1018/U1, and RTH111B1024/U1. The thermoswitches are mounted in a plastic housing or baseplate that conforms to or mates with an existing programmable thermostat and the device is installed in conjunction with the existing programmable thermostat.

In a preferred embodiment, the failsafe assembly or mechanism works without any electrical input to ensure heating and cooling will continue, within a limited range. In use, the injection molded plastic bracket or housing is fastened to the wall behind an existing programmable thermostat. Preferably, the thermoswitches are not adjustable but operate within a defined range. Jumper wires are wired in parallel with existing programmable thermostat wires. Primary residential temperature controls are provided by the existing programmable thermostat. It will be appreciated that programmable thermostats operate on battery power, but batteries and microprocessors fail. The present invention protects a home from freezing or overheating in the event of a failure.

In a preferred embodiment, the housing is injection molded plastic. However, this is not a limitation and the housing can be made of other materials and plastic that is not injection molded. Different housing shapes can be created that mate or match with different preexisting thermostat models.

In a preferred embodiment, the housing includes slots defined therein to allow natural convection air flow into and through the device to affect the temperature sensitive thermoswitches. The slots can also be positioned to align with existing ridges in the thermostat unit. The housing can be designed or shaped to fit a round thermostat (e.g., a Nest brand thermostat).

In a preferred embodiment, the heating cycle, lower threshold or first thermoswitch is normally open above 50° F. If the battery fails in the programmable thermostat and no heating signal is sent to the heating or air conditioning unit, the affected zone temperature falls. When the affected zone temperature cools below 50° F. the first thermoswitch closes, completing the thermostat circuit, and turning on the heating or air conditioning unit, thus providing heating. When the zone temperature rises to 60° F. the thermoswitch opens, the circuit is broken and no heating signal is sent to the heating or air conditioning unit. This cycle repeats until the programmable thermostat is repaired.

In a preferred embodiment, the cooling cycle, upper threshold or second thermoswitch is normally open below 80° F. If the battery fails in the programmable thermostat and no cooling signal is sent to the air conditioner the affected zone temperature rises. When the affected zone temperature rises above 80° F. the second thermoswitch closes, completing the thermostat circuit, and turning on the air conditioner, thus providing cooling. When the zone temperature cools to 70° F. the second thermoswitch opens, the circuit is broken and no cooling signal is sent to the air conditioner. This cycle repeats until the programmable thermostat is repaired. It will be appreciated that the terms "air conditioner" or "air conditioning unit" are used herein to apply to any unit that affects the temperature of the air, whether a heater, cooler or any other type of HVAC unit.

When retrofitting or installing the failsafe assembly, the jumper wires are soldered and wired in parallel with the already installed thermostat and the mounting or connection openings or holes are aligned with the holes of the existing thermostat wall plate for connection to the wall.

BRIEF DESCRIPTION OF THE DRAWINGS

The invention may be more readily understood by referring to the accompanying drawings in which.

Like numerals refer to like parts throughout the several views of the drawings.

DETAILED DESCRIPTION OF THE PREFERRED EMBODIMENTS

Figure 1:
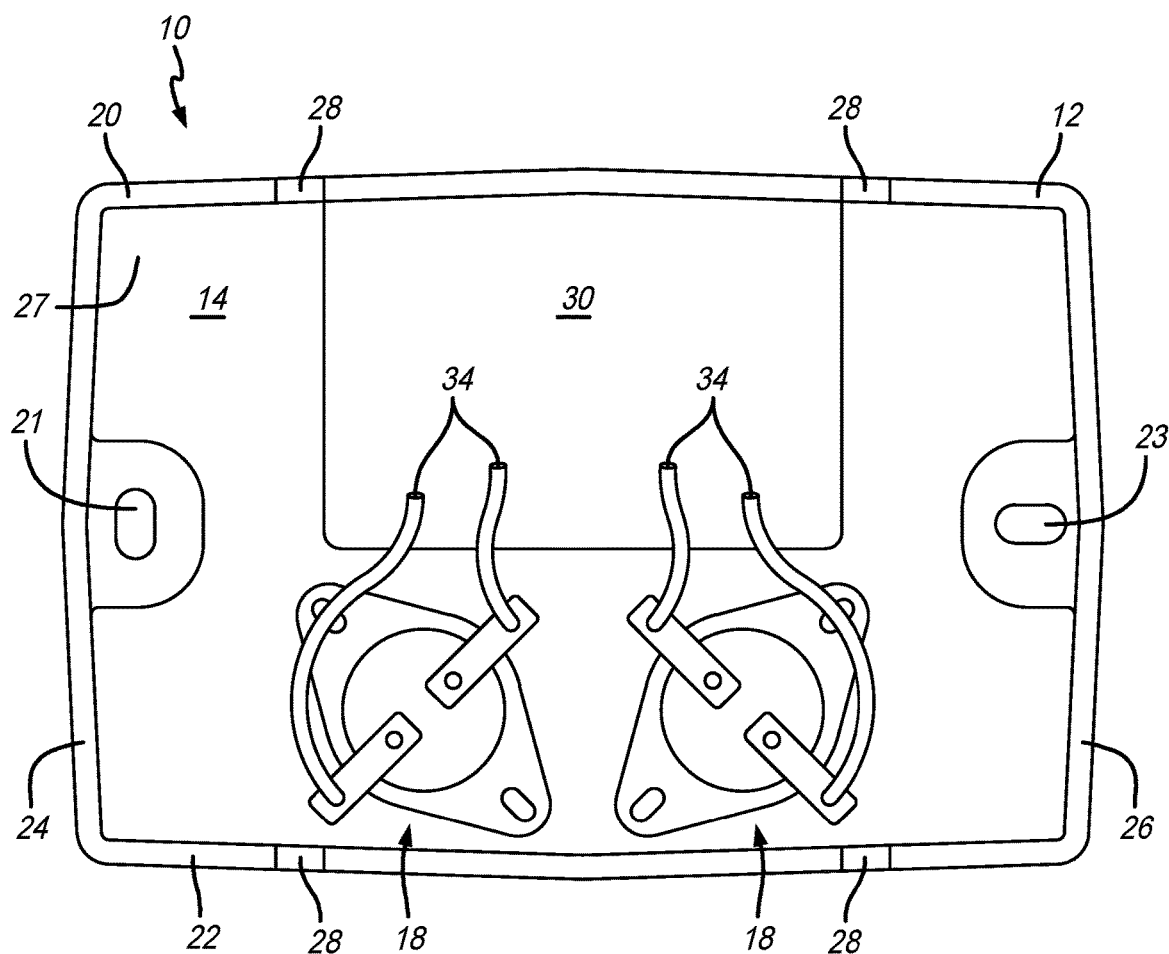
FIG. 1 is a front elevational view of a failsafe assembly in accordance with a preferred embodiment of the present invention.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are references to the same embodiment; and, such references mean at least one of the embodiments.

Reference in this specification to "one embodiment" or "an embodiment" means that a particular feature, structure, or characteristic described in connection with the embodiment is included in at least one embodiment of the-disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks: The use of highlighting has no influence on the scope and meaning of a term; the scope and meaning of a term is the same, in the same context, whether or not it is highlighted.

It will be appreciated that the same thing can be said in more than one way. Consequently, alternative language and synonyms may be used for any one or more of the terms discussed herein. No special significance is to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

It will be appreciated that terms such as "front," "back," "top," "bottom," "side," "short," "long," "up," "down," and "below" used herein are merely for ease of description and refer to the orientation of the components as shown in the figures. It should be understood that any orientation of the components described herein is within the scope of the present invention. It will be appreciated that the use of dimensions and other numerical measurements are only exemplary and are not limiting.

Referring now to the drawings, wherein the showings are for purposes of illustrating the present invention and not for purposes of limiting the same, FIGS. 1-4 show a failsafe assembly 10 for use with a thermostat unit 100 that includes a thermostat housing 102 and wall plate 104. It will be appreciated that the type of thermostat unit is not a limitation on the present invention. The operation and components of the thermostat unit are known in the art and will therefore be omitted from description herein.

Figure 2:
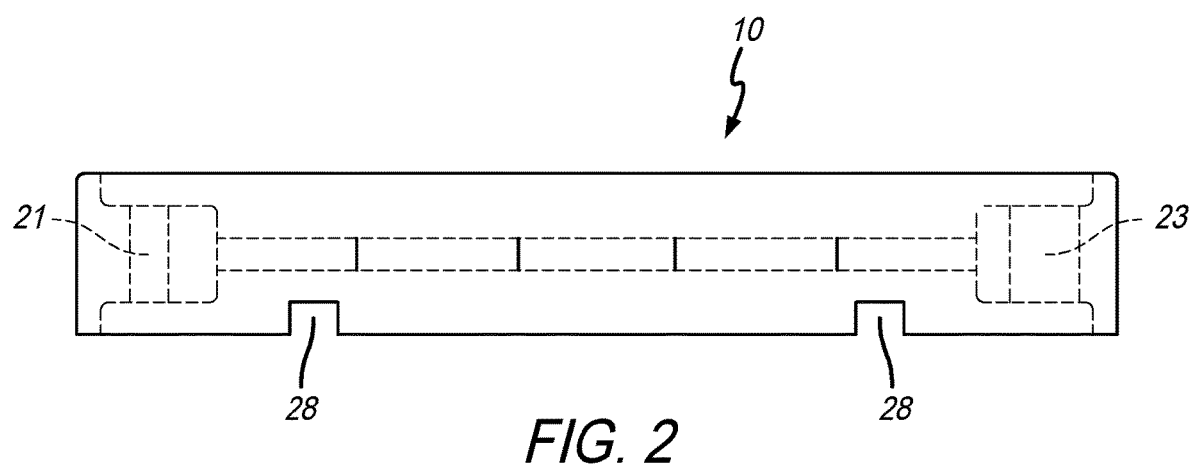
FIG. 2 is a top plan view of the failsafe assembly of FIG. 1.

As shown in FIGS. 1-2, the failsafe assembly 10 generally includes a housing 12 that defines a housing interior 14 and includes first and second thermoswitches 16 and 18 disposed in the housing interior 14. In a preferred embodiment, the housing 12 includes top 20, bottom 22 and first and second side walls 24 and 26, and a back wall 27 that cooperate to define the housing interior 14. The back wall 27 defines a wire opening 30 therein and the front of the housing is open 12. The housing 12 can also include a front wall that includes a front opening therein so that the wires of the thermostat unit 100 can be connected or communicated with the failsafe assembly 10. The housing 12 also preferably includes first and second connection openings 21 and 23 defined therein.

In a preferred embodiment, the first thermoswitch 16 includes an open state and a closed state and is normally in the open state. The first thermoswitch 16 is configured to switch to the closed state when the ambient temperature drops below a predetermined lower threshold temperature and is configured to switch back to the open state when the ambient temperature rises above a predetermined first safety temperature. The lower threshold temperature is preferably 50° F. However, the lower threshold temperature can be anywhere between 32° F. and 70° F. The first safety temperature is preferably 60° F. However, the first safety temperature can be anywhere between 33° F. and 70° F.

In a preferred embodiment, the second thermoswitch 18 includes an open state and a closed state and is normally in the open state. The second thermoswitch 18 is configured to switch to the closed state when the ambient temperature exceeds a predetermined upper threshold temperature and is configured to switch back to the open state when the ambient temperature drops below a predetermined second safety temperature. The upper threshold temperature is preferably 80° F. However, the upper threshold temperature can be anywhere between 50° F. and 100° F. The second safety temperature is preferably 70° F. However, the second safety temperature can be anywhere between 33° F. and 79° F.

The failsafe assembly 10 is configured to be attached to the thermostat unit 100 and positioned between the wall plate 104 and the wall 106. The thermostat unit 100 together with the failsafe assembly 10 is referred to herein as the thermostat assembly 32. The thermostat housing 102 includes wiring for communication with an air conditioning unit. The wall plate 104, is removably secured to a back surface 102*a* of the thermostat housing 102 and includes first and second connection openings 108 and 110 defined therein. In use, the housing 12 of the failsafe assembly 10 is secured to the back surface 104*a* of the wall plate 104. Threaded fasteners 120 can be used to extend through the first connection opening 108 in the wall plate and the first opening 21 in the housing 12, and the second connection opening 110 in the wall plate 104 and the second opening 23 in the housing 12.

As shown in FIG. 1, the first and second thermoswitches 16 and 18 include wiring 34. The wiring 34 is wired in parallel with the wiring of the thermostat unit 100. The type of wiring and the connections made therebetween is not a limitation on the present invention.

Figure 3:
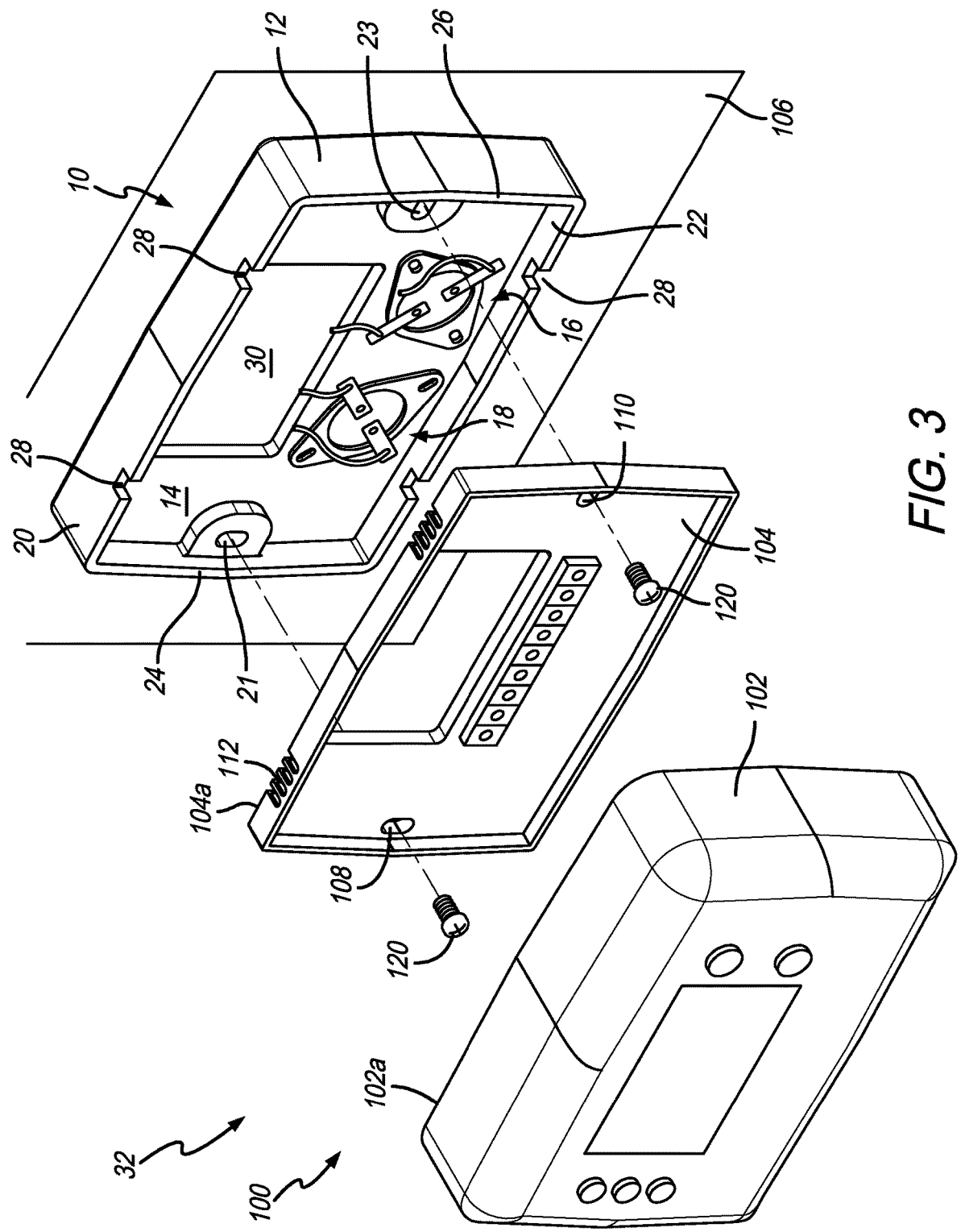
FIG. 3 is an exploded view of a thermostat assembly that includes the failsafe assembly of FIG. 1.
Figure 4:
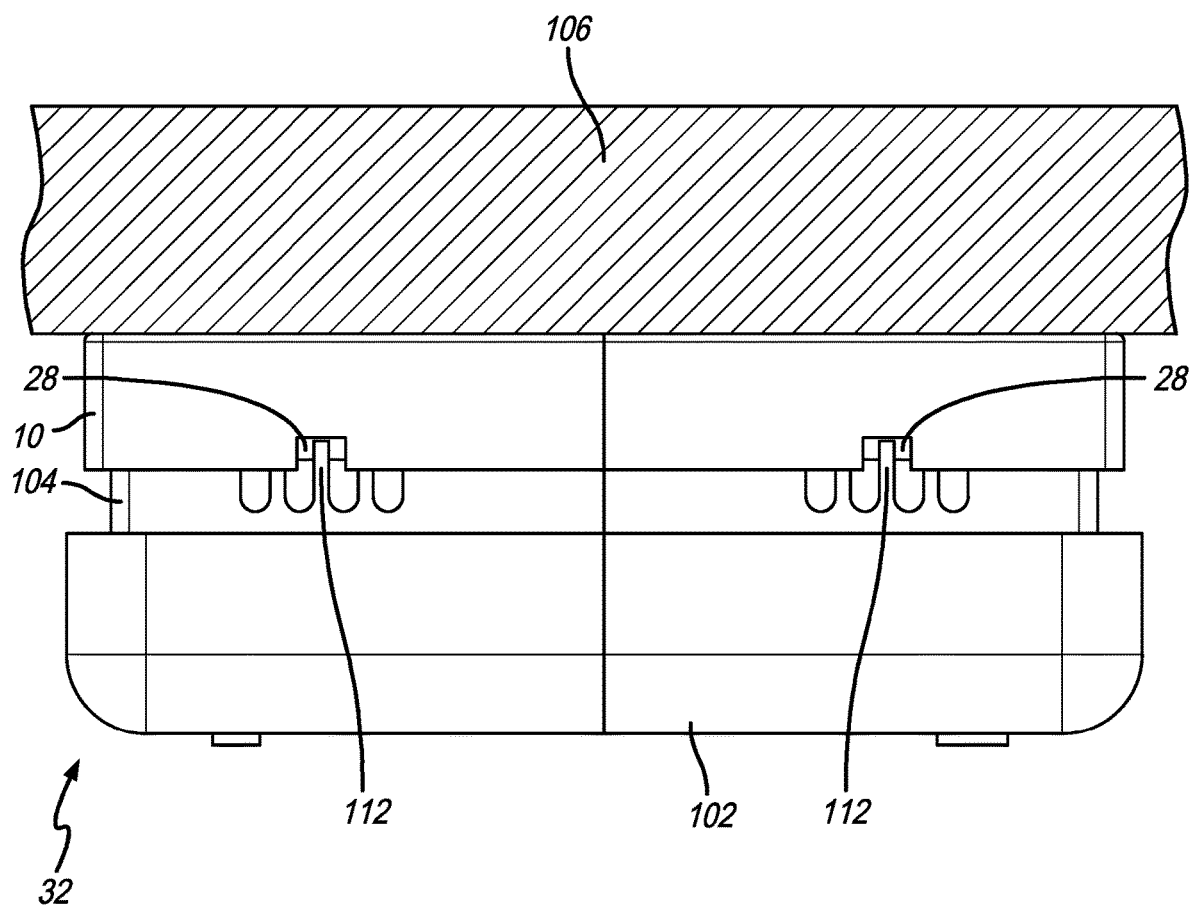
FIG. 4 is a top plan view of the thermostat assembly.

As shown in FIGS. 1-4, in a preferred embodiment, the top and bottom side walls 20 and 22 include slots 28 defined therein. The first and second side walls 24 and 26 can also include slots defined therein. The slots 28 allow natural convection air flow into and through the housing 12 to affect the first and second thermoswitches 16 and 18. As shown in FIGS. 3 and 4, the slots 28 can also be positioned to align with and receive therein existing ridges 112 in the thermostat unit 100 wall plate 104. In another embodiment, separate slots can be used for allowing air in and for mating with the ridges 112.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description of the Preferred Embodiments using the singular or plural number may also include the plural or singular number respectively. The word "or" in reference to a list of two or more items, covers all of the following interpretations of the word: any of the items in the list, all of the items in the list, and any combination of the items in the list.

The above-detailed description of embodiments of the disclosure is not intended to be exhaustive or to limit the teachings to the precise form disclosed above. While specific embodiments of and examples for the disclosure are described above for illustrative purposes, various equivalent modifications are possible within the scope of the disclosure, as those skilled in the relevant art will recognize. Further, any specific numbers noted herein are only examples: alternative implementations may employ differing values, measurements or ranges.

The teachings of the disclosure provided herein can be applied to other systems, not necessarily the system described above. The elements and acts of the various embodiments described above can be combined to provide further embodiments. Any measurements described or used herein are merely exemplary and not a limitation on the present invention. Other measurements can be used. Further, any specific materials noted herein are only examples: alternative implementations may employ differing materials.

Any patents and applications and other references noted above, including any that may be listed in accompanying filing papers, are incorporated herein by reference in their entirety. Aspects of the disclosure can be modified, if necessary, to employ the systems, functions, and concepts of the various references described above to provide yet further embodiments of the disclosure.

These and other changes can be made to the disclosure in light of the above Detailed Description of the Preferred Embodiments. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features or aspects of the disclosure with which that terminology is associated. In general, the terms used in the following claims should not be construed to limit the disclosures to the specific embodiments disclosed in the specification unless the above Detailed Description of the Preferred Embodiments section explicitly defines such terms. Accordingly, the actual scope of the disclosure encompasses not only the disclosed embodiments, but also all equivalent ways of practicing or implementing the disclosure under the claims.

Accordingly, although exemplary embodiments of the invention have been shown and described, it is to be understood that all the terms used herein are descriptive rather than limiting, and that many changes, modifications, and substitutions may be made by one having ordinary skill in the art without departing from the spirit and scope of the invention.

What is claimed is:

1. A failsafe assembly for use with a separate battery powered programmable thermostat unit that includes a wall plate and a thermostat housing, the failsafe assembly comprising:
   a housing that defines a housing interior,
   a first thermoswitch disposed in the housing interior, wherein the first thermoswitch includes an open state and a closed state and is normally in the open state, wherein the first thermoswitch is configured to switch to the closed state when an ambient temperature drops below a predetermined lower threshold temperature, and wherein the first thermoswitch is configured to switch back to the open state when the ambient temperature rises above a predetermined first safety temperature, and
   a second thermoswitch disposed in the housing interior, wherein the second thermoswitch includes an open state and a closed state and is normally in the open state, wherein the second thermoswitch is configured to switch to the closed state when the ambient temperature exceeds a predetermined upper threshold temperature, and wherein the second thermoswitch is configured to switch back to the open state when the ambient temperature drops below a predetermined second safety temperature,
   wherein the first and second thermoswitches include wiring that is configured to be connected to the separate programmable thermostat unit, and wherein in use the housing is configured to be positioned between the wall plate and a wall and the thermostat housing and the housing are separated by the wall plate.

2. The failsafe assembly of claim 1 wherein the housing includes top, bottom and first and second side walls and a back wall that cooperate to define the housing interior, wherein the back wall defines a wire opening therein, and wherein the front of the housing is open.

3. The failsafe assembly of claim 2 wherein at least one of the top, bottom and first and second side walls includes a slot defined therein.

4. The failsafe assembly of claim 1 wherein the failsafe assembly is not battery powered.

5. The failsafe assembly of claim 1 wherein the housing includes first and second connection openings defined therein that are each configured to receive a threaded fastener extending from the wall plate.

6. A thermostat assembly comprising:
   a thermostat housing that defines a thermostat housing interior and includes thermostat wiring for communication with an air conditioning unit, wherein a battery powered microprocessor is disposed in the thermostat housing interior,
   a wall plate removably secured to a back surface of the thermostat housing, wherein the wall plate includes first and second connection openings defined therein,
   a failsafe assembly that includes
      a housing that defines a housing interior, wherein the housing includes first and second connection openings defined therein, wherein the housing is removably secured to a back surface of the wall plate, wherein a first threaded fastener extends through the first connection opening in the wall plate and the first opening in the housing, and wherein a second threaded fastener extends through the second connection opening in the wall plate and the second opening in the housing,
      a first thermoswitch disposed in the housing interior, wherein the first thermoswitch includes an open state and a closed state and is normally in the open state, wherein the first thermoswitch is configured to switch to the closed state when an ambient temperature drops below a predetermined lower threshold temperature, and wherein the first thermoswitch is configured to switch back to the open state when the ambient temperature rises above a predetermined first safety temperature, and
      a second thermoswitch disposed in the housing interior, wherein the second thermoswitch includes an open state and a closed state and is normally in the open state, wherein the second thermoswitch is configured to switch to the closed state when the ambient temperature exceeds a predetermined upper threshold temperature, and wherein the second thermoswitch is configured to switch back to the open state when the ambient temperature drops below a predetermined second safety temperature,
   wherein the first and second thermoswitches are wired in parallel with the thermostat wiring of the thermostat housing, wherein the wall plate separates the battery powered microprocessor and the first and second thermoswitches, and when the thermostat assembly is secured to a wall, the first and second thermoswitches are positioned between the wall plate and the wall.

7. The thermostat assembly of claim 6 wherein the housing includes top, bottom and first and second side walls and a back wall that cooperate to define the housing interior, wherein the back wall defines a wire opening therein, wherein the front of the housing is open.

8. The thermostat assembly of claim 7 wherein at least one of the top, bottom and first and second side walls includes a slot defined therein, wherein the wall plate includes a ridge defined therein, and wherein the ridge is received in the slot.

9. The thermostat assembly of claim 7 wherein the thermostat wiring extends from the thermostat housing interior, through an opening in the wall plate, into the housing interior, to the first and second thermoswitches, and through the wire opening.

\* \* \* \* \*